United States Patent
Lalwani et al.

(12) 
(10) Patent No.: US 11,773,284 B2
(45) Date of Patent: Oct. 3, 2023

(54) COATING COMPOSITION FOR AUTOMOBILE UNDERBODIES

(71) Applicant: Mahindra & Mahindra Limited, Tamil Nadu (IN)

(72) Inventors: Rahul Lalwani, Tamil Nadu (IN); Babu Mahendran, Tamil Nadu (IN)

(73) Assignee: Mahindra & Mahindra Limited, District Kancheepura (IN)

( * ) Notice: Subject to any disclaimer, the term of this patent is extended or adjusted under 35 U.S.C. 154(b) by 593 days.

(21) Appl. No.: 16/817,414

(22) Filed: Mar. 12, 2020

(65) Prior Publication Data

US 2020/0369907 A1 Nov. 26, 2020

(30) Foreign Application Priority Data

May 22, 2019 (IN) .............................. 201941020242

(51) Int. Cl.
| | |
|---|---|
| *C09D 127/06* | (2006.01) |
| *C08L 27/06* | (2006.01) |
| *C09D 7/61* | (2018.01) |
| *C09D 7/63* | (2018.01) |

(52) U.S. Cl.
CPC ............. *C09D 127/06* (2013.01); *C09D 7/61* (2018.01); *C09D 7/63* (2018.01)

(58) Field of Classification Search
CPC .................................................. C09D 127/06
See application file for complete search history.

(56) References Cited

U.S. PATENT DOCUMENTS

| | | | | | |
|---|---|---|---|---|---|
| 5,691,059 | A | * | 11/1997 | Moh | ..................... C03C 17/225 |
| | | | | | 428/404 |
| 2006/0004140 | A1 | * | 1/2006 | Asano | ..................... C08L 63/10 |
| | | | | | 525/329.7 |
| 2015/0259497 | A1 | * | 9/2015 | Mihara | ..................... C08K 5/12 |
| | | | | | 521/59 |
| 2019/0291511 | A1 | * | 9/2019 | Alexander | ............ B29C 73/025 |
| 2020/0317947 | A1 | * | 10/2020 | Gupta | .................. C09D 127/06 |

FOREIGN PATENT DOCUMENTS

| | | | | | |
|---|---|---|---|---|---|
| JP | | 04126783 A | * | 4/1992 | |
| JP | | 05247384 A | * | 9/1993 | |
| WO | WO-9533784 A1 | * | 12/1995 | ............. C08G 18/10 |
| WO | WO-2014028481 A1 | * | 2/2014 | ................ C08J 3/18 |

OTHER PUBLICATIONS

Machine translation of JP 05-247384 A, published Sep. 24, 1923 << retrieved from EPO's Espacenet.com on Oct. 7, 2022 >>.*
Machine translation of JP 04-126783 A, published Apr. 27, 1992 << retrieved from EPO's Espacenet.com on Oct. 7, 2022 >>.*

* cited by examiner

*Primary Examiner* — Vickey Nerangis
(74) *Attorney, Agent, or Firm* — PILLSBURY WINTHROP SHAW PITTMAN LLP; Robert M. Bedgood; Jeffrey Sheriff

(57) ABSTRACT

The present invention relates to a coating composition for automobile underbodies from stone chipping damage and corrosion. The underbody coating composition comprises mixture of polyvinyl chloride homopolymer and polyvinyl chloride co-polymer resin. The coating composition of the present invention reduces film thickness and at the same time maintains the standard norms of quality.

15 Claims, No Drawings

COATING COMPOSITION FOR AUTOMOBILE UNDERBODIES

RELATED APPLICATIONS

This patent application claims the benefit of priority to Indian Patent Application No. 201941020242, filed May 22, 2019. The entire contents of the foregoing application is incorporated herein by reference.

FIELD OF INVENTION

The present invention relates to a coating composition for protecting automobile underbodies from stone chipping damage and corrosion and a method of preparing said coating composition.

BACKGROUND OF THE INVENTION

Automotive sealants are basically sealing compounds used to seal, protect assemblies and joints. The main function of the automotive sealant is to prevent the ingress of dust, dirt, moisture or water inside the automobile cabin. The automotive sealant also protects the vehicle from chipping, corrosion thereby enhancing the durability of the vehicle. The conventionally known underbody sealer, generally termed as Under Body Coating (UBC), is a polyvinyl chloride-based sealer applied on crucial areas of the vehicle like the floor, wheel arch, etc. It is a spray-able coating material that is applied in a paint shop and cured in the paint shop oven for 20 minutes at 140° C. Polymer Resin cross-links upon curing and impart its properties. The performance of an underbody coating is majorly analyzed by determining the parameters for e.g. specific gravity, impact resistance, abrasion resistance, shear strength, tensile strength, chipping resistance, corrosion resistance, and water resistance. The major disadvantage associated with the conventionally known underbody sealer is its huge amount of consumption per vehicle to meet the standard requirements of the above-stated parameters. The application of underbody sealer is even higher for vehicles that have off-road usage and rugged real-world usage pattern (RWUP). The specification of materials is more stringent in such vehicles and therefore, to meet this strict specification, a higher amount of sealer is used to get desired technical properties and durability.

However, usage of a higher amount of underbody sealer not only increases the cost of manufacturing but also increases the weight of the vehicle significantly. Considering the upcoming stringent emission norms which mandate vehicle weight reduction, there is a need for developing an underbody coating which can be applied in lower amount thereby reducing the coating thickness, weight with similar or better durability & without changing the manufacturing process.

SUMMARY OF THE INVENTION

In one aspect, the present invention provides for a coating composition. The coating composition comprises polyvinyl chloride homopolymer and polyvinyl chloride co-polymer resin. The coating composition further comprises a plasticizer, adhesion promoters, additives, mineral derivatives, mineral fillers, and a solvent.

In another aspect of the present invention, a method of preparing coating composition is provided.

DETAILED DESCRIPTION OF INVENTION

The present invention provides for a coating composition. In an aspect of the present invention, the coating composition comprises a polyvinyl chloride homopolymer and polyvinyl chloride co-polymer resin. The coating composition comprises 20 wt % of polyvinyl chloride homopolymer and 11 wt % of polyvinyl copolymer resin. The polymers of the polyvinyl chloride copolymer resin are selected from polyvinyl chloride and polyvinyl acetate copolymer. Further, polyvinyl chloride homopolymer is present in the form of polyvinyl chloride homopolymer Type 1 and polyvinyl chloride homopolymer Type 2 form in an amount of 11 wt % and 9 wt % respectively. The combination of Type 1 and Type 2 polyvinyl chloride homopolymer having different average molecular weight aids in achieving the desired physical properties in the coating composition of the present invention.

The coating composition of the present invention further comprises a plasticizer, adhesion promoters, additives, mineral derivatives, mineral fillers, and a solvent. The said coating composition comprises 31 wt % of a plasticizer, 3.5 wt % of adhesion promoters, 1.25 wt % of additives, 4 wt % of mineral derivatives, 23.25 wt % of mineral fillers and 6 wt % of a solvent.

The plasticizer present in the coating composition of the present invention is selected from phthalate esters. Preferably, the plasticizer is Di-Iso nonyl phthalate.

The adhesion promoters present in the coating composition of the present invention are selected from modified polyamide, polyamido amine and blocked aliphatic polyisocyanate. The said adhesion promoters comprise 0.5 wt % of modified polyamide, 2 wt % of polyamido amine and 1 wt % of a blocked aliphatic polyisocyanate. In a preferred embodiment, the blocked aliphatic polyisocyanate is 1-6-Di-Isocyanate hexane, butanone oxime-blocked.

Generally, thixotropic agent, moisture scavenger, fillers, swelling agent etc can be used as additives in a coating composition. The additives as provided in the coating composition of the present invention is a combination of 0.25 wt % of thixotropic agent, 0.50 wt % of moisture scavenger, 0.25 wt % of filler, and 0.25 wt % of swelling agent, of the total composition wherein the thixotropic agent is a siloxane silica, preferably silicon dioxide; moisture scavenger is an oxazolidine, preferably 3-ethyl-2-methyl-2-3-methyl-butyl-1-3-oxazolidine; filler is titanium glass, preferably barium titanate; and swelling agent is glass bubble, preferably sodium and silicone oxide. The filler used as an additive in the coating composition of the present invention is a low-density filler.

The mineral derivatives present in the coating composition of the present invention are selected from calcium oxide, zinc oxide and mixture thereof. The mineral derivatives comprise 3 wt % of calcium oxide, 1 wt % of zinc oxide. The said mineral derivatives are acting as drier and heat stabilizer respectively. Further, the mineral fillers are selected from precipitated calcium carbonate, ground calcium carbonate and mixture thereof. The mineral fillers comprise 18.25 wt % of precipitated calcium carbonate and 5 wt % of ground calcium carbonate.

The solvent in the underbody coating composition of the present invention is a paraffinic solvent, preferably an aliphatic hydrocarbon.

In an embodiment, the coating composition of the present invention comprises 31 wt % of a plasticizer, 20 wt % of a polyvinyl chloride homopolymer, 11 wt % of a polyvinyl chloride co-polymer resin, 3.5 wt % of adhesion promoters, 1.25 wt % of additives, 4 wt % of mineral derivatives, 23.25 wt % of mineral fillers and 6 wt % of a solvent.

In another aspect of the present invention, method of preparing a coating composition is provided. The method of preparing the coating composition comprises adding polyvinyl chloride homopolymer and polyvinyl chloride co-polymer resin to the mixer; mixing the components added in the mixer; transferring the mixture to a holding tank; and filtering the mixture. The method of preparing the coating composition further comprises adding of plasticizer, adhesion promoter, additives, mineral derivatives, of mineral fillers and solvent to the mixer.

The polymers of polyvinyl chloride co-polymer resin are selected from polyvinyl chloride and polyvinyl acetate copolymer.

The coating composition of the present invention is required in lesser amount for coating the underbody of the vehicle resulting in a reduced thickness of the film which ultimately reduces the weight of the underbody coating.

The combination of polyvinyl chloride-based homopolymer and polyvinyl chloride co-polymer resin according to the present invention resulted in improved rigidity and consequently improved materials properties and lesser thickness required to achieve said properties. The application of the coating composition of the present invention on vehicle underbody reduces the film thickness by 33% as compared to the existing underbody coating with similar or better performance. Thus, vehicles which are meant for off-road use in which specification of material is more stringent, it is possible with the coating composition of the present invention to reduce coating thickness without compromising the quality.

The coating composition of the present invention has less material consumption per vehicle as an outcome of which up to 30% cost can be saved. Further, the resultant material consumption is expected to come down to 2.2 to 4.5 kg per vehicle ultimately leading to material and weight saving per vehicle.

The following examples describe the invention and should not be considered to limit the scope of the invention.

EXAMPLES

The underbody coating composition of the present invention has undergone a thorough validation for component/panel level and vehicle level.

Panel level validation consists of number of tests like adhesion, tensile strength, shear strength, abrasion resistance, impact resistance, chipping resistance, corrosion resistance, bending resistance, chemical resistance aging characteristics like humidity resistance, thermal shock resistance, low-temperature resistance, and storage stability. Test results were analyzed against that of the existing technology and then vehicle level trial was completed in the actual production line. Vehicle level trial was done with the existing line without any tool modification. Wet Film Thickness (WFT) was precisely measured at several locations immediately after application and Dry Film Thickness (DFT) measured after the vehicle completes its curing cycle. Applicability was determined analyzing viscosity, spray-ability, pattern, tact time and visual appearance after baking. Significant reduction in film thickness was achieved without compromising on the quality of the above-stated parameters as per the required standards Example A The conventional underbody coating was prepared by mixing the components according to the formulation of Example A as provided in Table 1. The components were mixed for about 2.5 hours and the temperature was maintained at around 35° C. by running chilled water around the mixer jacket. The mixture was then transferred to a holding tank for aging for about 10-12 hours. Subsequently, the mixture was filtered to obtain the conventional coating composition.

Example 1

The components according to the formulation of Example 1 as provided in Table 1 were collected in a mixer. The components were mixed for about 2.5 hours and the temperature was maintained at around 35° C. by running chilled water around the mixer jacket. The mixture was then transferred to a holding tank for aging for about 10-12 hours. Subsequently, the mixture was filtered to obtain a coating composition of the present invention.

TABLE 1

The following table below illustrates the Coating Composition of the present invention (Example 1) and Conventional Coating Compsition (Example A).

| Raw Material | Compounds | Example 1 (weight %) | Example A (weight %) |
| --- | --- | --- | --- |
| Primary plasticizer | Di Iso nonyl phthalate | 31.00 | 31.00 |
| Bonding Agent Type 1 (Adhesive) | 1-6-Di-Isocyanato hexane, butanone oxime blocked | 1.00 | 1.00 |
| Bonding Agent Type 2 (Adhesive) | Polyamido amine | 2.00 | 1.5 |
| Bonding Agent Type 3 (Adhesive) | Modified Polyamide | 0.50 | 0.50 |
| Thixotropic agent | Silicon di oxide | 0.25 | 0 |
| Moisture Scavenger | 3-ethyl-2-methyl-2-3-methyl-butyl-1-3-oxazolidine | 0.50 | 0 |
| Drier | Calcium Oxide | 3.00 | 3.5 |
| Low Density Special Filler | Barium Titanate | 0.25 | 0 |
| Heat Stabilizer | Zinc Oxide | 1.00 | 1.00 |
| Precipitated calcium carbonate | Calcium Carbonate | 18.25 | 20 |
| Swelling Agent | Sodium & Silicon Oxide | 0.25 | 0 |
| Ground calcium carbonate | Calcium Carbonate | 5.00 | 5.00 |
| PVC Homopolymer Type 1 | Polyvinyl Chloride | 11.00 | 15.00 |
| PVC PVAc Co-polymer | Polyvinyl Chloride & Polyvinyl Acetate Copolymer | 11.00 | 5.00 |
| PVC Homopolymer Type 2 | Polyvinyl Chloride | 9.00 | 10.00 |
| Solvent | Aliphatic Hydrocarbon | 6.00 | 6.5 |
| Total | | 100 | 100 |

With the coating composition of the present invention underbody coating composition similar or better performance is achieved with 33% less coating thickness as compared to the conventional composition. This not only reduces the consumption of coating material but also reduced the overall weight of the vehicle. The reduction in resultant material consumption also reduces the cost of production.

We claim:

1. A coating composition for automobile underbodies comprising 20 wt % polyvinyl chloride homopolymer and 11 wt % polyvinyl chloride co-polymer resin, 31 wt % of a plasticizer, 3.5 wt % of adhesion promoters, 1.25 wt % of additives, 4 wt % of mineral derivatives, 23.25 wt % of mineral fillers and 6 wt % of a solvent, based on the coating composition, wherein the polyvinyl chloride co-polymer resin is polyvinyl chloride and polyvinyl acetate copolymer resin.

2. The coating composition as claimed in claim 1, wherein the polyvinyl chloride homopolymer comprises 11 wt % of polyvinyl chloride homopolymer Type 1 and 9 wt % of polyvinyl chloride homopolymer Type 2 based on the coating composition.

3. The coating composition as claimed in claim 1, wherein the plasticizer is a phthalate ester.

4. The coating composition as claimed in claim 1, wherein the adhesion promoters comprise, 0.5 wt % of modified polyamide, 2 wt % of polyamido amine and 1 wt % of a blocked aliphatic polyisocyanate based on the coating composition.

5. The coating composition as claimed in claim 1, wherein the additives comprise mixture of 0.25 wt % of a thixotropic agent, 0.50 wt % of a moisture scavenger, 0.25 wt % of a filler, and 0.25 wt % of a swelling agent, based on the coating composition.

6. The coating composition as claimed in claim 5, wherein the thixotropic agent is silicon dioxide.

7. The coating composition as claimed in claim 5, wherein the moisture scavenger is 3-ethyl-2-methyl-2-3-methyl-butyl-1-3-oxazolidine.

8. The coating composition as claimed in claim 5, wherein the filler is barium titanate glass.

9. The coating composition as claimed in claim 5, wherein the swelling agent is sodium and silicon oxide bubble.

10. The coating composition as claimed in claim 1, wherein the mineral derivatives are selected from calcium oxide, zinc oxide and mixture thereof.

11. The coating composition as claimed in claim 10, wherein the mineral derivatives comprises 3 wt % of calcium oxide and 1 wt % of zinc oxide based on the coating composition.

12. The coating composition as claimed in claim 1, wherein the mineral fillers are selected from precipitated calcium carbonate and ground calcium carbonate and mixture thereof.

13. The coating composition as claimed in claim 12, wherein the mineral fillers comprise 18.25 wt % of precipitated calcium carbonate and 5 wt % of ground calcium carbonate based on the coating composition.

14. The coating composition as claimed in claim 1, wherein the solvent is a paraffinic solvent.

15. A method of preparing the coating composition of claim 1, the method comprising:
 a. adding the polyvinyl chloride homopolymer, the polyvinyl chloride co-polymer resin, the plasticizer, the adhesion promoters, the additives, the mineral derivatives, the mineral fillers, and the solvent to the mixer;
 b. mixing the components of step (a);
 c. transferring the mixture of step (b) to a holding tank;
 d. filtering the mixture of step (c).

* * * * *